March 8, 1938. W. B. WAIT 2,110,456
SPEED AND CUT-OFF INDICATOR FOR LOCOMOTIVES
Filed Jan. 26, 1935 2 Sheets-Sheet 1

INVENTOR
WILLIAM BELL WAIT
BY
ATTORNEY

March 8, 1938.　　　　W. B. WAIT　　　　2,110,456
SPEED AND CUT-OFF INDICATOR FOR LOCOMOTIVES
Filed Jan. 26, 1935　　　2 Sheets-Sheet 2
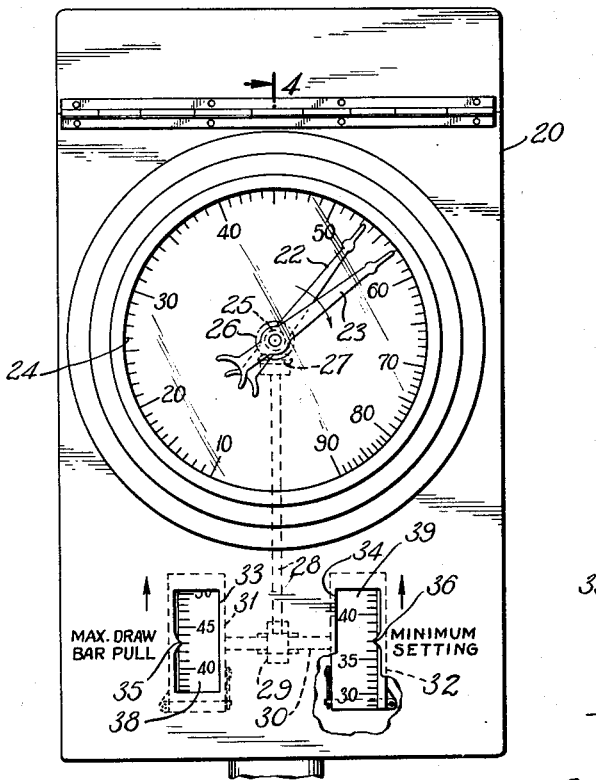
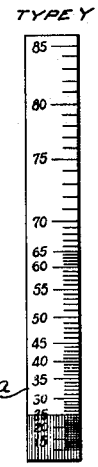
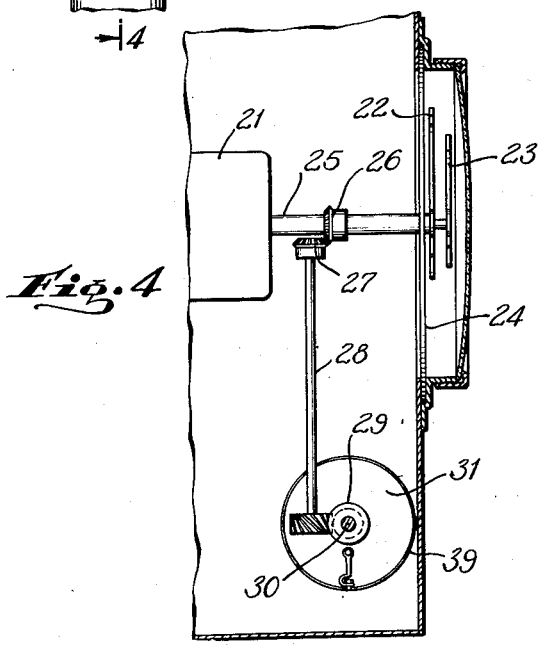
INVENTOR
WILLIAM BELL WAIT
BY
ATTORNEY Patented Mar. 8, 1938

2,110,456

UNITED STATES PATENT OFFICE 2,110,456

SPEED AND CUT-OFF INDICATOR FOR LOCOMOTIVES

William Bell Wait, New York, N. Y.

Application January 26, 1935, Serial No. 3,600

5 Claims. (Cl. 116—129)

The present invention relates to improvements in speed and cut-off indicators for locomotives. Such indicators are usually provided with a hand which moves over a dial to show the instant speed of the locomotive and also with another hand which shows the instant setting of the cut-off valve gear in terms of speed. The hands are so correlated that when one overlies the other the engineer will know that his valve gear is set for maximum draw-bar pull of the locomotive at the particular speed indicated by the speed hand. If the cut-off hand departs from the speed hand in one direction it indicates waste of fuel, while if it departs therefrom in the opposite direction it indicates economy of fuel.

An object of the present invention is to provide means which will show the locomotive engineer not only the directions in which waste and economy are respectively indicated but also a permissible range of cut-off settings.

On every locomotive or class of locomotives there is for each particular speed a particular cut-off setting which will produce maximum tractive effort and another shorter cut-off which at each particular speed and load will produce maximum fuel economy. There is also on each locomotive or class of locomotives for each incidental speed a point beyond which the percentage of piston stroke should not be shortened when the locomotive is working and under load without a loss of efficiency and economy. It is an object of the present invention to provide means for indicating such limiting point for each speed of the locomotive.

On each locomotive or class of steam locomotives there is also a low limit below which the cut-off should not be shortened regardless of speed when the engine is working. It is an object of the present invention to provide means for indicating such cut-off limit.

My invention also contemplates the provision of means for indicating the requisite cut-off settings in terms of percentage of piston stroke. Up to recent times, railroad men have always considered cut-off settings in terms of percentage of piston stroke, and since it is sometimes difficult for them to change from a life long habit and consider cut-off in terms of speed, it is desirable to provide an instrument which will indicate the cut-off settings in percentage of piston stroke.

My invention also contemplates an instrument in which the cut-off indication in terms of speed may be entirely eliminated. In one form of my invention, I provide a speedometer having means correlated therewith for showing solely in terms of percentage of piston stroke the cut-off setting for each speed that will give maximum draw-bar pull, thereby eliminating the speed corrected cut-off indicating mechanism and the means connecting the same with the cut-off valve gear which have heretofore been used in speed and cut-off indicators.

A further object of the invention is to provide an instrument of the character just described in which the indication of cut-off settings for maximum draw-bar pull are supplemented by an indication, for each speed and in terms of percentage of piston stroke, of a permissible range of shorter cut-offs for economy when maximum tractive effort is not required.

Since the range of permissible cut-off settings varies with different locomotives and/or classes of locomotives, it is a further object of my invention to provide means for conveniently adapting the cut-off indications to suit the particular locomotive or class to which the instrument is applied.

Other objects and advantages of my invention will appear in the following description of a preferred embodiment and a modification thereof and thereafter the novelty and scope of the invention will be pointed out in the claims.

In the accompanying drawings:

Fig. 3 is a front elevation of a modified form of speed and cut-off indicator in which cut-off settings are shown in terms of percentage of piston stroke;

Fig. 4 is a fragmental view in section, taken on the line 4—4 of Fig. 3;

Fig. 5 is a plan view of a removable scale of cut-off settings used in the instrument shown in Figs. 3 and 4; and, Fig. 6 is a similar view of another scale adapted for another type of locomotive.

Figure 1:
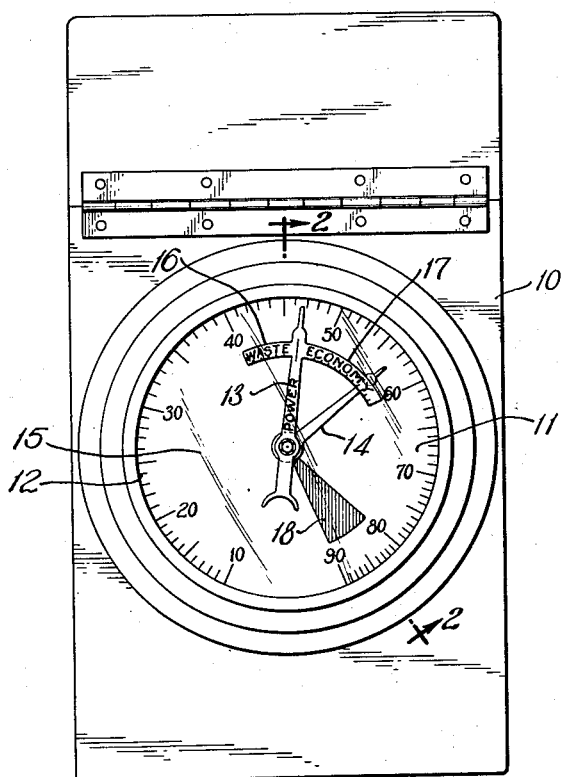
Figure 1 is a view in front elevation of my improved speed and cut-off indicator.
Figure 2:
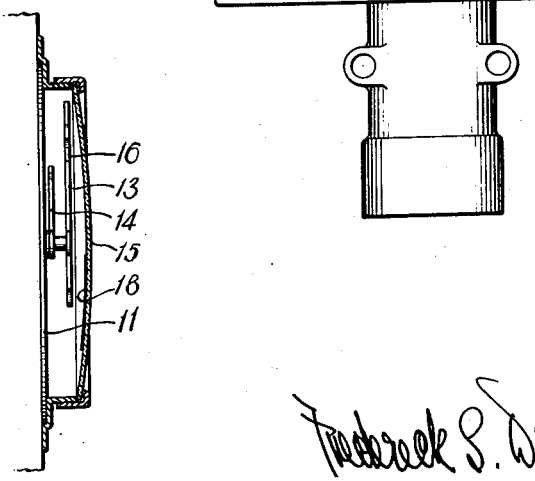
Fig. 2 is a fragmental view in section of the dial portion of the indicator, the section being taken on the line 2—2 of Fig. 1.

In the drawings I do not show the interior mechanism of the indicator instrument nor the connections thereof with the locomotive, as such parts may be of standard make. Suffice it to say that the instrument includes mechanism suitably driven as, for instance, by a track wheel of a locomotive to indicate the speed of the locomotive and also mechanism controlled by the reversing lever or the like to indicate the instant cut-off setting, the latter indication being modified by suitable mechanism, such as that shown in Patent No. 1,704,381, issued March 5, 1929, so that it will read in terms of speed. The two indications are thus read on the same dial which is graduated in miles per hour or any other unit of speed. A speed hand moves over the dial to indicate the instant speed of the locomotive, and a cut-off hand is moved over the same dial under control of the cut-off gear in such ratio that when the two hands point to the same graduation it will indicate that the cut-off setting is such as to give maximum draw-bar pull for the particular speed indicated by the speed hand.

The casing of my improved instrument is indicated by the reference numeral 10. This casing carries a dial 11 which has suitable graduations 12 thereon, reading clockwise and indicating miles per hour. A speed hand 13 is mounted to swing over the dial, being controlled by mechanism, such as described above, so that it will indicate the instant speed of the locomotive. Mounted to turn on the same axis is a cut-off hand 14 which is driven by mechanism, such as described above, to indicate the instant cut-off setting of the locomotive in terms of speed. A glass or other transparent cover 15 fits over the hands and dial. The cut-off hand 14 is mounted to pass under or back of the speed hand 13. The latter is provided near its outer end with a wing 16 extending in counter-clockwise direction and the wing may bear the word "Waste". Another wing 17 extends in the opposite direction and may bear the word "Economy". On the body of the hand itself may be marked the word "Power".

In operation, when the locomotive is being brought up to speed and from that point of speed at which the locomotive should be hooked up, that is, the point at which the cut-off should be first shortened, the engineer should endeavor to keep the cut-off and the speed hands alined by proper manipulation of the reversing lever or power reverse gear. As long as the speed hand 13 directly overlies the cut-off hand, he will know that he is obtaining maximum draw-bar pull. Whenever the cut-off hand lags so that it passes under the wing marked "Waste" the engineer will know that he is wasting fuel. When the locomotive has got up to desired speed the engineer may shorten the percentage of cut-off by operating the reversing lever so that the cut-off hand will advance under the wing marked "Economy". The wings may be graduated, as shown, to gage the extent of separation of the two hands. The length of the wing 17 serves to indicate for each speed the permissible range of settings shorter than that giving maximum draw-bar pull and the engineer should keep the cut-off hand within the span of the wing 17. However, since the wing is of fixed length it will be evident that when the speed hand climbs to a high figure, such as, say, seventy miles an hour in the particular instrument illustrated, the wing 17 will extend too far, i. e., it would indicate a permissible cut-off that would be entirely too short for the particular locomotive. We may assume that for said locomotive the cut-off limit would be 25 per cent. of piston stroke and that this percentage is reached when the cut-off hand points to "80". I, therefore, provide a shaded segment 18 between the markings "80" and "90". The shading may be formed on the under side of the cover 15, or, if desired, it may be formed on the face of the dial itself. This will serve as a warning to the locomotive engineer that when working the engine he must not shorten the cut-off beyond the point at which the cut-off hand 14 would enter this shaded area.

Since the minimum percentage of cut-off and also the range of cut-offs for different speeds varies with different locomotives, I provide the instrument with a removable speed hand which may be replaced with a hand of different wing spread to suit a different locomotive or class of locomotives. Also, in order to set the minimum perecentage of cut-off for different classes of locomotives, a different glass cover may be provided for each locomotive or class of locomotive with a shaded area marked thereon of the proper angular extent to suit such particular locomotive or class. Where the low or short limit of cut-off percentage is indicated by shading the dial face itself, it will be obvious that different dial faces may be provided for different locomotives or classes of locomotives.

In Figs. 3 to 6 inclusive, I show another form of my invention in which cut-off settings are indicated in percentage of piston stroke. This instrument comprises a casing 20 in which is located at 21 a suitable driving mechanism for operating a speed hand 22 and a cut-off hand 23. These hands move over a dial 24 which is graduated in miles per hour or any other suitable measure of speed. If desired, the cut-off hand 23 may be eliminated together with the actuating mechanism therefor. However, there are some advantages in using the cut-off hand which is driven like the hand 14 in Fig. 1, by proper connection with the reversing gear through correcting mechanism of the type adapted to translate the cut-off settings into terms of speed.

The speed hand 22 is mounted on a sleeve 25 which carries a bevel pinion 26. This is engaged by a bevel pinion 27 mounted on a vertical shaft 28. This shaft drives through spiral gears 29, a transverse shaft 30. Mounted on the shaft 30 are two drums 31 and 32. In the casing 20 are formed windows 33 and 34 which are provided at the central horizontal axis thereof with fixed pointers 35 and 36 respectively. Removably mounted on the drum 31 is a flexible scale 38 which is graduated to indicate cut-off settings in terms of percentage of piston stroke. This scale is visible through the window 33 and is read with respect to the pointer 35. Another scale 39 mounted on the drum 32 may be seen through the window 34 and is read with respect to pointer 36. This scale 39 is also graduated in terms of percentage of piston stroke, but the relative positions of the two scales are such that the scale 38 will indicate the cut-off setting which will give maximum draw-bar pull for the speed indicated by the speed hand, while at the same time the scale 39 will indicate the range of cut-off for fuel economy and the minimum cut-off setting in terms of percentage of piston stroke which should be used at that particular speed.

In operation then, as the speed hand swings over the dial it will move the drums 31 and 32 correspondingly and the operator by reading the figure on the scale 38 opposite the pointer 35 will know to what percentage of piston stroke he must set his reversing gear in order to obtain maximum draw-bar pull. After the locomotive has attained the desired speed he may economize fuel by advancing the cut-off, or, in other words, setting it for a lower percentage of piston stroke than that indicated on the scale 38. The other scale 39 will then show him the range of cut-off for fuel economy and the minimum setting which he should use for the particular speed.

In Figs. 5 and 6, I show two of the scales which may be employed on the drum 32. The scale 39 is adapted for one type of locomotive, indicated in Fig. 5 as type X, while the scale 39a illustrates a scale adapted for use on another type of locomotive, indicated in Fig. 6, as type Y. Thus, by the simple expedient of shifting scales, it is possible to adapt the instrument for different types of locomotives. It will be observed that the lower portion of each scale 39 and 39a is shaded. This shaded part may in actual practice be colored red to indicate the limit beyond which the cut-off setting should never be lowered for the particular locomotive to which the instrument is applied, when the locomotive is being worked. In the particular scales illustrated, a cut-off setting of 25 per cent. of piston stroke is indicated as the absolute permissible limit, but, obviously, this limit would vary on different scales according to the characteristics of the particular locomotive to which the instrument was applied. In operation, the engineer would be warned against further lowering of the cut-off setting when the red portion of the scale came into view opposite the pointer 36.

While I have described two embodiments of my invention, it will be understood that these are to be taken as illustrative and not limitative and that I reserve the right to make various changes in form, construction and arrangement of parts, as may fall within the spirit and scope of the following claims.

I claim:

1. A speed and cut-off indicator for a locomotive, comprising a dial, a speed hand movable over the dial in response to variations of speed of the locomotive, a cut-off hand movable over the dial in response to variations in settings of the cut-off valve gear, the movements of the hands being so correlated that for each speed, when the cut-off gear is set to give maximum draw-bar pull, the cut-off hand will point to the same speed as the speed hand, and a shield covering an area of the dial which the cut-off hand may not invade without setting the cut-off below a predetermined minimum.

2. A speed and cut-off indicator for a locomotive, comprising a dial, a speed hand movable over the dial in response to variations of speed of the locomotive, a cut-off hand movable over the dial in response to variations in settings of the cut-off valve gear, the movements of the hands being so correlated that for each speed, when the cut-off gear is set to give maximum draw-bar pull, the cut-off hand will point to the same speed as the speed hand, an arcuate gage carried by the speed hand and indicating by its length the minimum cut-off setting that can be used at each speed without affecting the economy of operation and riding qualities of the locomotive, and means on the dial indicating an area which the cut-off hand may not invade without setting the cut-off below a predetermined minimum.

3. A speed and cut-off indicator for locomotives comprising a speedometer adapted to indicate the speed of a locomotive, a pair of dials, a fixed pointer for each dial, and means driven by the speedometer for rotating the dials with respect to their indicators, one of the dials being graduated to indicate for each speed the cut-off in terms of piston stroke which will give maximum draw-bar pull and the other dial being graduated to indicate for each speed a predetermined minimum cut-off setting.

4. A speed and cut-off indicator for locomotives comprising a speedometer adapted to indicate the speed of a locomotive, a pair of drums driven by the speedometer, a pair of fixed pointers, one for each drum, a scale removably mounted on each drum, one of the scales being graduated to indicate, for each speed, the cut-off in percentage of piston stroke which will give maximum draw-bar pull, and the other scale being graduated to indicate for each speed a predetermined minimum percentage of cut-off.

5. A speed and cut-off indicator for locomotives comprising a speedometer adapted to indicate the speed of a locomotive, a pair of drums driven by the speedometer, a pair of fixed pointers, one for each drum, a scale removably mounted on each drum, one of the scales being graduated to indicate for each speed the cut-off setting in percentage of piston stroke which will give maximum draw-bar pull and the other to indicate for each speed a predetermined minimum cut-off setting, the latter scale being also marked to indicate a low limit of cut-off setting for the particular locomotive to which it is applied.

WILLIAM BELL WAIT.